United States Patent Office 3,606,473
Patented Sept. 20, 1971

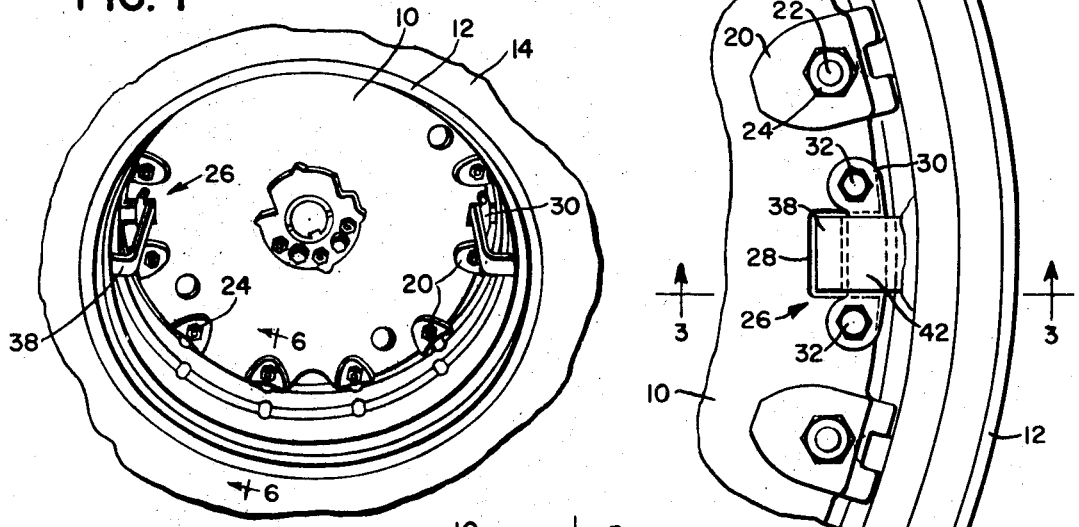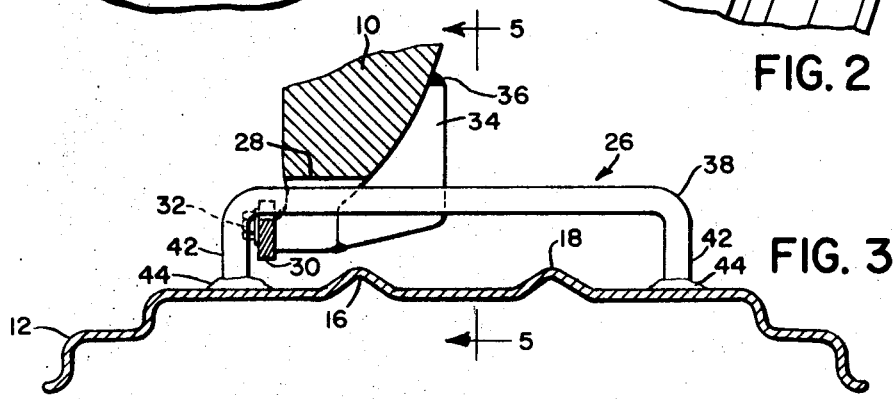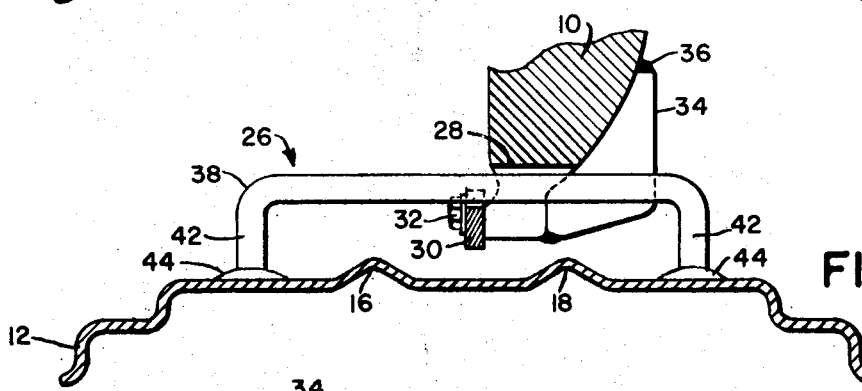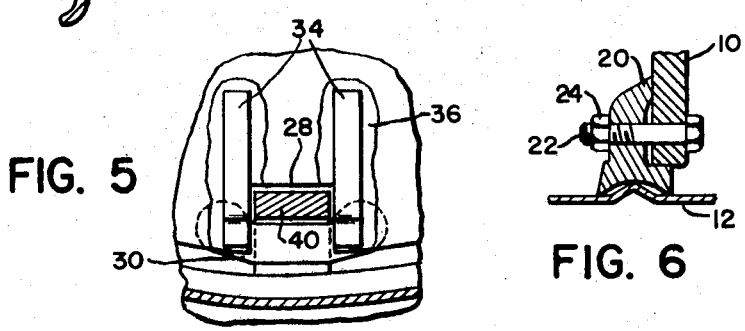

3,606,473
ADJUSTABLE WHEEL AND RIM ASSEMBLY
Norman Frederick Lemmon, Cedar Falls, Iowa, assignor to Deere & Company, Moline, Ill.
Filed Nov. 5, 1969, Ser. No. 874,137
Int. Cl. B60b 23/12
U.S. Cl. 301—9TV                    1 Claim

ABSTRACT OF THE DISCLOSURE

A rim having axially spaced apart seats on its inner periphery is selectively axially positionable on a wheel by means of releasable seat-engaging clamps and means cooperates between the wheel and rim to guide the rim axially during shifting and to prevent axial escape of the wheel from the rim.

BACKGROUND OF THE INVENTION

This invention relates to an adjustable wheel and rim assembly.

It is commonplace, especially in agricultural tractors, to provide means for varying the tread of the traction wheels. One conventional way to do this is to release each rim from its wheel, shift the rim axially relative to the wheel to a new position and re-clamp the rim in its new position. Theoretically, this can be achieved, within limits, without completely removing the rim from the wheel. But the task is not an easy one, because the combined weight of the rim and tire, especially when the latter contains ballast, is often more than one man can handle; e.g., 1400 lbs. Consequently, tread variations by means of the method and means referred to has become laborious, and time consuming. Also, such tread adjustment has required the use of special tools, such as overhead hoists, etc., so that an additional tool investment or the additional inconvenience and expense of visiting a service facility has often been necessary.

SUMMARY OF THE INVENTION

According to the present invention, the above problems are solved by the provision of means cooperative between the wheel and rim for guiding and confining the rim during axial adjustment so that the rim cannot escape from the wheel. The invention features at least one—and preferably two diametrically opposed—means including cooperative axially elongated members affixed to the inner periphery of the rim and slidably received by openings or slots in the wheel periphery so that, when the usual clamps are removed, the rim remains supported by the wheel. It is also a feature of the invention that each wheel opening is a slot opening radially to the rim periphery so as to receive the associated rim member, and the slot is closed across its open end to receive and confine the rim member, which itself is in the form of a U having an axially elongated bight slidable through the opening and opposite legs affixed to the rim and serving as stops to prevent the rim from escaping axially from the wheel. The blocking means is removable so that the rim can be removed when necessary. The wheel is supplemented at each opening with guide means for stabilizing the rim during axial adjustment.

BRIEF DESCRIPTION OF THE DRAWINGS

FIG. 1 is a perspective of a wheel and rim assembly;
FIG. 2 is an enlarged fragmentary elevation of the same;
FIG. 3 is an enlarged section on the line 3—3 of FIG. 2;
FIG. 4 is a similar section but shows a different axial position of the rim;

FIG. 5 is a fragmentary view, partly in section, as seen along the line 5—5 on FIG. 3; and
FIG. 6 is a reduced-scale section on the line 6—6 of FIG. 1.

DESCRIPTION OF A PREFERRED EMBODIMENT

A typical traction wheel, rim and tire assembly is shown in FIG. 1 as including a cast wheel 10, a customary rim 12 and a pneumatic tire 14. The inner periphery of the rim has a pair of circumferential ribs 16 and 18 which provide selective seat portions for complementarily grooved clamps 20 that are releasably securable to the peripheral portion of the wheel 10 by bolts 22 and 24. FIG. 6 best shows how each clamp engages a rim seat 16 or 18 and how such clamp is secured to the wheel to exert a combination of axial and radial forces whereby the plurality of clamps 20 secures the rim to the wheel. When a change in axial position of the rim is desired, the clamps are released and preferably removed and the rim is shifted bodily axially until its other rib or seat 16 or 18 is axially proximate to the wheel periphery. Compare FIGS. 3 and 4. The clamps are re-seated on the newly selected rib 16 or 18 and re-fastened to the wheel by the bolts and nuts 22 and 24. This is all conventional.

As will be seen, when the clamps 20 are released and/or removed, the rim tends to drop somewhat onto the upper peripheral portion of the wheel and it very often happens that the rim, when being shifted axially, will slip completely off the wheel. To prevent this, the present invention provides control means operative to retain the rim while permitting axial shifting.

The control means includes a plurality of identical elongated members and cooperative wheel-carried means, designated as a whole at 26. There are preferably two such means arranged in diametrical relation.

For each means, the wheel-carried part includes a slot or notch 28 opening radially outwardly to the rim, plus a blocking member 30 which spans the open end of the notch so that the notch becomes in effect an axially directed through opening. The member 30 is removably attached to the wheel as by cap screws 32. The wheel is provided at one side thereof and at each slot or opening with a pair of axial guide extensions or means 34, each rigidly secured as by welding at 36. The guides of each pair are circumferentially spaced apart on the order of the width of the opening or slot 28 (FIG. 5) and in effect form means increasing the width or thickness of the wheel in the area of each slot 28, since the peripheral portion of the wheel is much more narrow than the width of the rim. The guide extensions aid in stabilizing the released rim during adjustment as will appear below.

Each elongated member, denoted unitarily at 38, is of U shape and has an elongated bight 40 and a pair of legs 42. The bight is radially inward of the rim 12 and the legs project outwardly and are affixed to axially spaced portions of the rim as by welding at 44.

The rims are manufactured with the members 38 thereon. For installation on the wheel, the blocking members 30 are removed and the rim is mounted, with the bights received in the respective slots 28, after which the members 30 are replaced in bridging relation to the respective bights, thereby confining the rim to the wheel while permitting axial shifting within the axial limits established by the legs 42 which serve as stops or abutments against opposite sides of the wheel.

A preferred method of using the structure while making an axial adjustment of the rim on the wheel is, after jacking up the vehicle, to rotate the wheel, rim and tire assembly until the two control means 26 are alined on a horizontal diameter. The clamps 20 are released and/or or removed. Since the members 38 are relatively closely confined in the wheel openings 28 and because of the stabilizing effect of the guide extensions 34, the rim is adequately supported for axial sliding relative to the wheel and is held against substantial cocking and wobbling; although, a slight amount of lost-motion is desirable to enable manual "nudging" of the rim to its new position, after which the clamps 20 are replaced, this time engaging their new rim seat 16 or 18.

When it is necessary to remove the rim from the wheel, the blocking members 30 may be easily taken off to free the members 38 for axial withdrawal from the slots.

As is apparent, the wheel and rim modifications necessary to accommodate the structural changes permitting the invention to function may be easily and economically made.

I claim:
1. A wheel and rim assembly comprising: a wheel disc having a relatively narrow axial dimension at its outer periphery and having a pair of axially extending slots diametrically opposite to one another at the outer periphery of the wheel; a tire rim having a relatively wide axial dimension and a slightly greater diameter inner periphery than the outer periphery of the wheel and having axially spaced annular seat mounting portions thereon, the rim being axially shiftable between alternate axial portions relative to the wheel and secured therein by a number of releasable clamps operative between the outer periphery of the wheel and the alternate seat portions on the rim; a pair of U-shaped members each having an elongated axially extending bight portion, the opposite ends of said members being secured to axially spaced areas on the inner periphery of the rim and projecting inwardly therefrom diametrically opposite to one another and circumferentially spaced from the clamps, the axially extending bight portion of each member being axially slidably received within the slots in the wheel periphery to limit rotation of the rim relative to the wheel; and a pair of blocking members removably secured to the wheel and respectively spanning the slots in the wheel radially outwardly of the bight portions of the U-shaped members, the blocking members respectively engaging the opposite legs of the respective U-shaped members to limit the axial movement in opposite directions of the rim relative to the wheel when the clamps are released to prevent the axial escape of the rim from the wheel.

References Cited

UNITED STATES PATENTS

| | | | |
|---|---|---|---|
| 2,129,807 | 9/1938 | Beckman | 301—9TV |
| 2,432,385 | 12/1947 | Court | 301—9TV |
| 2,727,789 | 12/1955 | Kanemoto | 301—9TV |
| 2,874,998 | 2/1959 | Brink | 301—9TV |

FOREIGN PATENTS

| | | | |
|---|---|---|---|
| 1,329,663 | 5/1963 | France | 301—9TV |

RICHARD J. JOHNSON, Primary Examiner